United States Patent
Bahrman

[15] 3,690,712
[45] Sept. 12, 1972

[54] GRAB HOOK ASSEMBLY

[72] Inventor: Wilbur N. Bahrman, 3031 Shakespeare Road, Bethlehem, Pa. 18017

[22] Filed: March 15, 1971

[21] Appl. No.: 124,355

[52] U.S. Cl.........294/82 R, 24/73 HH, 24/230.5 BH
[51] Int. Cl..................................................B66c 1/34
[58] Field of Search...294/82; 24/73 R, 73 CE, 73 HH, 24/73 TH, 230.5 R, 230.5 AD, 230.5 BH, 230.5 LH; 59/85, 93

[56] References Cited

UNITED STATES PATENTS

| | | | |
|---|---|---|---|
| 2,244,572 | 6/1941 | Rawlins | 24/73 |
| 1,667,541 | 4/1928 | Edeburn | 24/230.5 |
| 2,591,986 | 4/1952 | Weiss et al. | 24/230.5 |

Primary Examiner—Evon C. Blunk
Assistant Examiner—Johnny D. Cherry
Attorney—John I. Iverson

[57] ABSTRACT

A grab hook assembly for use in the straightening of motor vehicle frames and the like. The hook is S-shaped and has a link-receiving grab hook at one end and a reverse open throat hook formed at the other end which is designed to fit in the welding jig holes provided in the structural members of a motor vehicle frame by the manufacturer. Included in the assembly is a removable collar member adapted to fit over the leading end of the reverse open throat hook to enlarge the bearing surface thereof when the hook is used in large diameter jig holes.

3 Claims, 4 Drawing Figures

Patented Sept. 12, 1972
3,690,712
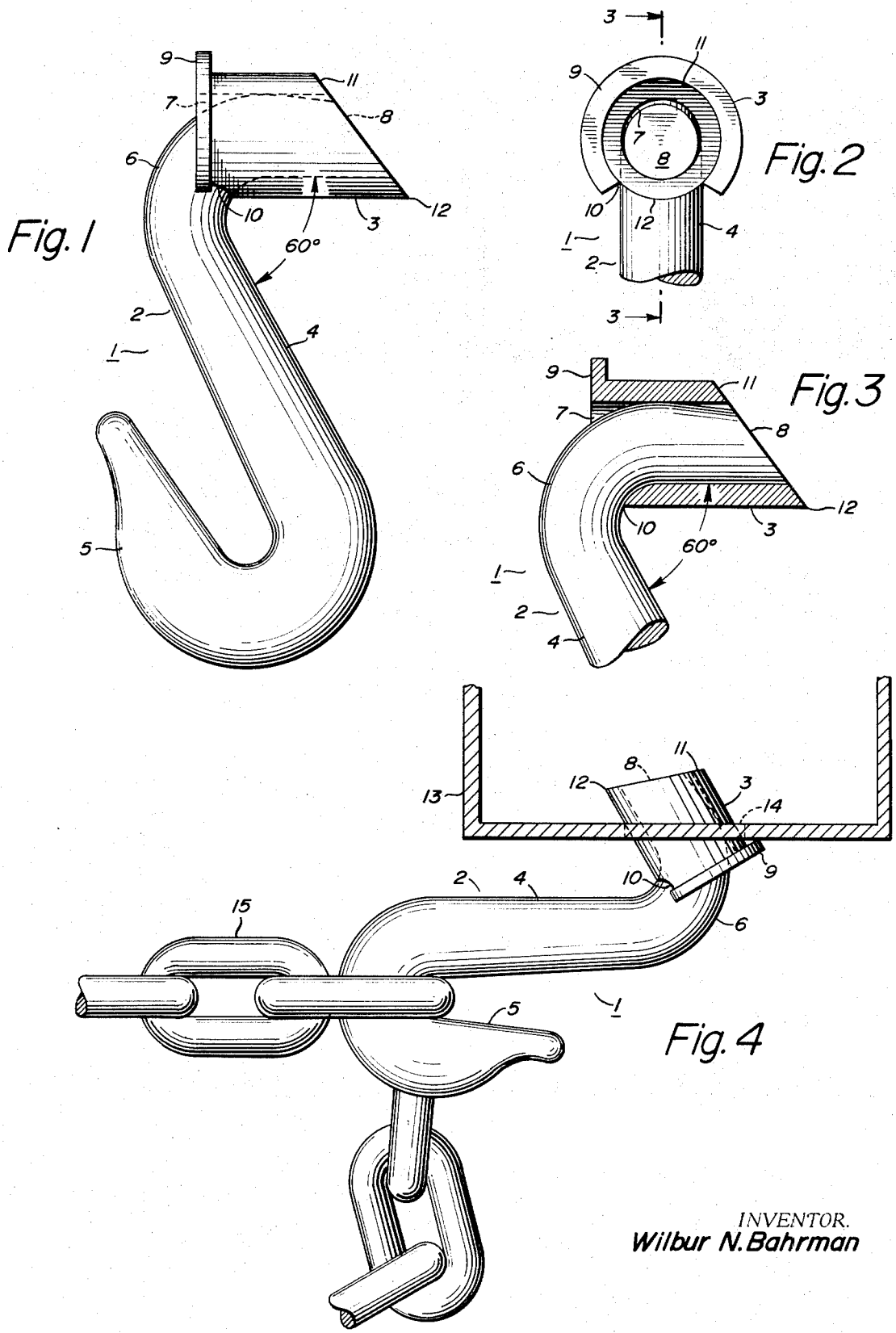
INVENTOR.
Wilbur N. Bahrman

GRAB HOOK ASSEMBLY

BACKGROUND OF THE INVENTION

This invention relates to apparatus for use in the straightening of damaged motor vehicle frames and more particularly to a grab hook assembly used to attach a chain to a motor vehicle frame.

When modern motor vehicles become involved in an accident, the frame of the motor vehicle is frequently bent or distorted and must be repaired along with the other damage. In many cases, a major portion of the repair work involves straightening the frame. Most repair shops are equipped with various types of frame straightening equipment which can apply straightening forces to the bent portions of the frame by means of hydraulic or mechanical jacks and the like. In order that such frame straightening equipment can be adapted to all types of motor vehicles and all types of frame damage, the equipment usually uses heavy steel chains to transmit the straightening forces to the various portions of the frame. Usually the chain is secured to the motor vehicle frame by merely wrapping the free end of the chain around the channel or box member of the frame and then securing the free end of the chain to the standing portion of the chain with a conventional grab hook or slip hook. In many cases, however, that portion of the frame to which the force must be applied is not sufficiently accessible to permit the wrapping of the chain around it. In such cases, the obstructing portions of the motor vehicle must be removed before the chain can be properly secured to the frame. The removal of fenders, body panels and the like just to get access to the frame is a major reason why motor vehicles frame straightening can often be time consuming and expensive.

SUMMARY OF THE INVENTION

It is therefore an object of this invention to provide means for quickly and easily attaching a chain to a damaged motor vehicle frame.

It is a further object of this invention to provide means for attaching most modern types of motor vehicle frame straightening equipment to a damaged motor vehicle frame.

It is a still further object of this invention to provide means for attaching a chain to all portions of most modern motor vehicle frames in a manner which permits the most efficient use of the frame straightening forces.

Other and further objects of this invention will become apparent from the following description and the accompanying drawings and claims.

It has been discovered that the foregoing objects can be obtained by an S-shaped hook having an elongated shank, a link-receiving grab hook formed at one end of the shank and a reverse open throat hook formed at the other end of the shank which is adapted to engage the welding jig holes or other openings put in modern motor vehicle frames by the manufacturer. A removable collar member adapted to fit over the leading end of the reverse open throat hook makes the hook adaptable to all types of motor vehicle frames.

BRIEF DESCRIPTION OF THE DRAWINGS

FIG. 1 is an elevation view of the grab hook assembly of this invention.

FIG. 2 is a partial end view of the grab hook assembly of the invention.

FIG. 3 is a section taken along lines 3—3 in FIG. 2.

FIG. 4 is an elevation view of the grab hook assembly of this invention attached to a portion of a typical motor vehicle frame.

DESCRIPTION OF THE PREFERRED EMBODIMENTS

Referring to FIGS. 1, 2 and 3, the grab hook assembly 1 of this invention consists of a generally S-shaped hook 2 and a removable collar member 3. As shown in FIG. 1, the S-shaped hook 2 has an elongated shank 4 forming a link receiving grab hook 5 and a reverse open throat hook 6.

As best shown in FIG. 2, the open throat hook 6 has a substantially circular cross section while the shank 4 and grab hook 5 may be more elliptical in cross section.

The removable collar member 3 has a circular bore 7 extending through its length and is adapted to fit closely over the leading end of the reverse open throat hook 6. As best shown in FIGS. 1 and 3, the collar member 3 has an annular flange 9 formed at one end. The collar member 3 also has a slot 10 cut in the flanged end which slot 10 is as wide as the S-shaped hook 2 at the apex of the open throat. This slot 10 permits the collar member 3 to fit tightly against the curved apex of the open throat hook 6. As shown in FIG. 3, the inner wall of the collar member 3 is rounded off slightly to assist in fitting the collar member 3 to the to the curved apex of the open throat hook 6.

As shown in FIGS. 1 and 3, the leading end 8 of the reverse open throat hook 6 and the non-flanged end 11 of the collar member 3 are beveled to form a sharpened edge 12 capable of cutting through heavy gage sheet metal.

The outside diameter of collar member 3 may be of any dimension while the inside diameter of the bore 7 is slightly larger than the outside diameter of the leading end 8 of the reverse open hook 6. Both the S-shaped hook and the collar member 3 are preferably made of steel.

The open throat hook 6 is designed to fit in one of the welding jig holes provided in the frame of most modern motor vehicles by the manufacturer. In constructing a motor vehicle frame, most manufacturers assemble the various structural members on a jig which holds the members in place while they are welded together. The various members are provided with a series of holes so that the members may be held in proper position on the welding jig by pins. After the frame has been welded these holes normally serve no further purpose.

The grab hook assembly 1 of this invention enables one to use these welding jig holes for the straightening of damaged motor vehicle frames. FIG. 4 illustrates how the great hook assembly 1 of the invention may be hooked into one of the welding jig holes 14 in the motor vehicle frame 13. As shown in FIG. 4, the open throat hook 6 and the collar member 3 fit in the jig hole 14. If the hole is of a small diameter, the hook 6 may be used alone. If the hole is of a larger diameter a suitable sized collar member 3 is used with the hook 6. The collar 3 permits a greater bearing surface in the large diameter jig holes 14 and prevents any distortion or tearing of the holes when the straightening forces are applied to the grab hook assembly 1. I prefer to make the leading end 8 of the open throat hook 6 about three-fourth inch in diameter. I have found collar members 3 with an outside diameter of one, one and one quarter and one and one half inches will accommodate most jig holes in modern motor vehicle frames.

I have that by making the angle of the open throat of the hook 6 about 60°, the hook 6 can be easily inserted in a jig hole but will not readily fall back out.

The flange 9 of the collar member 3 prevents the hook 6 from going too far into the jig hole 14 whereby the collar member 3 may slip off and become lost in the interior of a boxlike frame member.

The cutting edge 12 of the leading end 8 of the open throat hook 6 permits the leading end to be used to cut a hole at a point in the frame if no jig hole exists or to enlarge an existing hole by hitting the hook assembly 1 with a hammer. It is also useful in cutting through the fibrous under coating material used on many motor vehicle frames to protect against corrosion.

When the grab hook assembly is in place as shown in FIG. 1, a heavy chain 15 may be connected to the grab hook 5 as shown in FIG. 4. The other end of the chain 15 is then attached to a jacking device (not shown) or a rigid support so that the frame straightening forces may then be applied to the damaged motor vehicle frame.

As can be readily seen the grab hook assembly of this invention can be used with most modern motor vehicle frame straightening equipment.

I claim:

1. A hook assembly for attaching a chain to the frame of a motor vehicle or the like comprising an S-shaped hook having an elongated shank, a link-receiving grab hook formed at one end of said shank and a reverse open throat hook formed at the other end of said shank, a removable collar member adapted to fit over the leading end of the reverse open throat hook to enlarge the diameter thereof.

2. The hook assembly of claim 1, in which one end of the collar member is provided with an annular flange.

3. The hook assembly of claim 1, in which one end of the collar member is provided with a slot having a width at least as wide as the S-shaped hook at the apex of the throat of the reverse open throat hook.

* * * * *